United States Patent [19]

Yamaguchi

[11] Patent Number: 4,925,507
[45] Date of Patent: * May 15, 1990

[54] LAMINATING METHOD OF THERMOPLASTIC RESIN MEMBERS

[75] Inventor: Akira Yamaguchi, Saitama, Japan

[73] Assignee: Fuji Photo Film Co., Ltd., Kanagawa, Japan

[*] Notice: The portion of the term of this patent subsequent to Jan. 17, 2006 has been disclaimed.

[21] Appl. No.: 246,452

[22] Filed: Sep. 19, 1988

[30] Foreign Application Priority Data

Sep. 18, 1987 [JP] Japan .................................... 234101

[51] Int. Cl.⁵ .............................................. B29C 65/08
[52] U.S. Cl. ................................... 156/73.1; 156/219; 156/309.6; 156/580.2; 264/23
[58] Field of Search ..................... 156/73.1, 580.2, 581, 156/308.2, 219, 309.6

[56] References Cited

U.S. PATENT DOCUMENTS

| | | | |
|---|---|---|---|
| 3,602,257 | 8/1971 | Berleyoung et al. | 264/23 |
| 4,164,068 | 8/1979 | Shropshire et al. | 156/73.1 |
| 4,230,757 | 10/1980 | Toner | 156/73.1 |
| 4,647,325 | 3/1987 | Bach | 156/73.1 |
| 4,798,639 | 1/1989 | Yamaguchi | 156/73.1 |

FOREIGN PATENT DOCUMENTS 58-074316 5/1983 Japan ................... 156/73.1

Primary Examiner—Michael Wityshyn
Attorney, Agent, or Firm—McAulay, Fisher, Nissen & Goldberg

[57] ABSTRACT

A laminating method of thermoplastic resin members which comprises, superposing a (n−1)th thermoplastic resin plate on a (n−2)th thermoplastic resin plate, bonding the (n−1)th thermoplastic resin plate to the (n−2)th thermoplastic resin plate by ultrasonic welding with an ultrasonic horn having projections and indentations on the pressure face from the upside of the (n−1)th thermoplastic resin plate wherein n is an integral number of more than 2, repeating the above process when n is more than 3, superposing a nth thermoplastic resin plate on the welded (n−1)th thermoplastic resin plate, and bonding the nth thermoplastic resin plate to the (n−1)th thermoplastic resin plate by ultrasonic welding with an ultrasonic horn having a flat pressure face from the upside of the nth thermoplastic resin plate.

5 Claims, 5 Drawing Sheets

FIG. 2
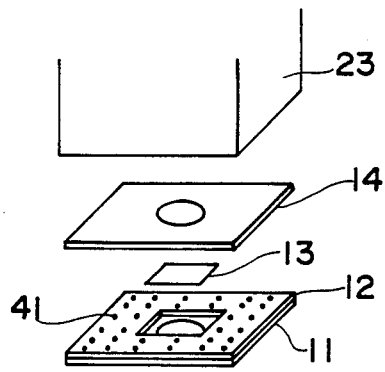
FIG. 3A
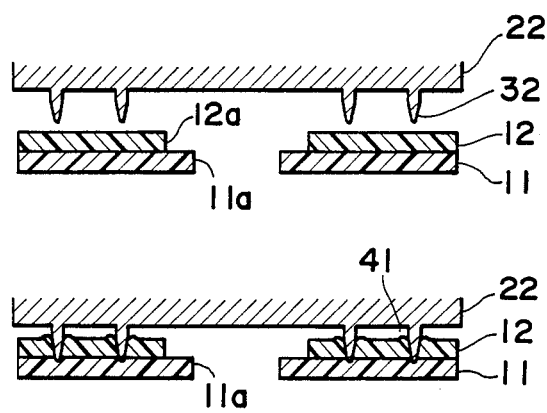
FIG. 3B

LAMINATING METHOD OF THERMOPLASTIC RESIN MEMBERS

BACKGROUND OF THE INVENTION

1. Field of the Invention

This invention relates to a laminating method using ultrasonic welding where at least three thermoplastic resin plates (hereinafter referred to as "plastic plate") are superposed to form a laminate, such as, a frame of a chemical analytical slide used for supporting a chemical analytical film.

2. Description of the Prior Art

Heretofore, in a conventional manner of welding plastic plates by utilizing frictional heat generated by ultrasonic vibration in the plastic plates, projections called energy directors have been provided (hereinafter referred to as "energy concentrating bodies") for concentrating ultrasonic vibration energy at arbitrary points on the plastic plates. In this method, the manufacturing cost was increased because of the need to furnish plastic sheet materials with the energy concentrating bodies. For example, for forming projections on the plastic sheet by embossing, embossing equipment and additional labor were required. Particularly, for making a laminate by superimposing three or more plastic plates one on another the manufacturing cost was considerably increased because two or more plastic plates have to be furnished with the projections. In addition, forming such projections causes the accuracy in of the thickness and flatness of the plates to be decreased.

Therefore, it was desired to develop a method for ultrasonic welding capable of bonding three or more plastic plates without forming energy concentrating bodies on the sheet material prior to bonding and capable of securing flatness.

SUMMARY OF THE INVENTION

An object of the invention is to provide a laminating method capable of laminating three or more plastic plates inexpensively without degrading the flatness. More particularly, the present invention provides a method for laminating by means of ultrasonic vibrations three or more plastic plates without previous embossing on the plates.

In the invention, the above problems have been solved by a method which comprises superimposing a second plastic plate on a first plastic plate, bonding the second plastic plate to the first plastic plate by ultrasonic welding by applying ultrasonic vibration using a first ultrasonic horn having projections and indentations on the end surface in contact with the upper surface of the second plastic plate, superimposing a third plastic plate on the laminate where the second plastic plate has been bonded to the first plastic plate, and bonding the third plastic plate to the laminate by ultrasonic welding by applying ultrasonic vibration by a second ultrasonic horn contacting with and pressing the upper surface of the third plate.

The above second ultrasonic horn preferably has a flat pressure face, because the surface of the laminate can be made flat.

In the invention, the above problem has also been solved by a second method which comprises superimposing a second plastic plate to a first plastic plate, bonding the second plastic plate to the first plastic plate by ultrasonic welding by applying ultrasonic vibration using a ultrasonic horn having projections and indentations on the end surface contacting with and pressing the upper surface of the second plastic plate, superimposing a third plastic plate on the laminate where the second plastic plate has been bonded to the first plastic plate, and bonding the third plastic plate to the laminate by ultrasonic welding by applying ultrasonic vibration using a ultrasonic horn having projections and indentations on the end surface contacting with and pressing the third plastic plate. As used herein, the terms "upper" and "upside" refer to the direction from which the ultrasonic horn is contacted with the surface of the plate being welded.

BRIEF DESCRIPTION OF THE DRAWINGS

FIG. 2 is an exploded perspective view in the stage of step D in FIG. 1.

FIG. 3 is a sectional view illustrating the laminating process in Example 2.

DETAILED DESCRIPTION OF THE INVENTION

Figure 1A:
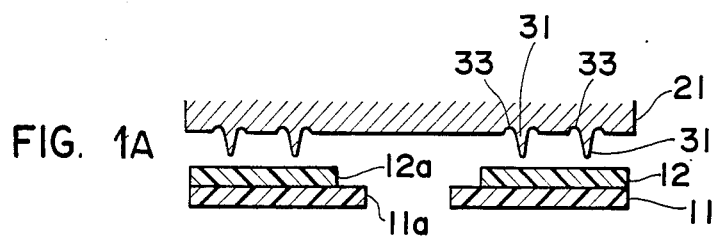
FIG. 1 is a sectional view illustrating the laminating process in Example 1.

In the above second method it is preferable to include a process wherein n is an integer greater than 2, superposing a (n-1)th plastic plate on a (n-2)th plastic plate of which the upper face has been provided with projections by applying ultrasonic vibration using an ultrasonic horn having projections and indentations on the pressure face, bonding the (n-1)th plastic plate to the (n-2)th plastic plate by ultrasonic welding by applying ultrasonic vibration using an ultrasonic horn having projections and indentations on the end surface from the upside of the (n-1)th plastic plate, superimposing a nth plastic plate on the bonded (n-1)th plastic plate, and bonding the nth plastic plate to the (n-1)th plastic plate by ultrasonic welding by applying ultrasonic vibration using an ultrasonic horn having a flat end surface contacting with and pressing the n-th plastic plate. The above process results in the laminate having flat outer surfaces. For example, a fourth plastic plate can be superimposed on the third plastic plate and bonded to the third plastic plate by applying ultrasonic vibration using an ultrasonic horn having a flat end surface contacting with and pressing the fourth plastic plate.

When two plastic plates superimposed on each other are bonded by using an ultrasonic horn of which the end surface is provided with projections and indentations, low protrusions are formed by flow of the melted plastic at the site where the projections come into contact with the surface of the plate into the space formed by the indentations of the horn. The protrusions act as energy concentrating bodies stage when the next plastic plate is superimposed thereon and bonded by ultrasonic welding. Therefore, a third plastic plate superimposed so as to contact at the protrusions can be bonded by ultrasonic welding, and a laminate of plastic plates having three or more layers can be made. If an ultrasonic horn having a flat end surface is used for the ultrasonic welding of the third layer plastic plate, a three-layered laminate of plastic plates having a flat outer surface is obtained.

If an ultrasonic horn having projections and indentations on the end surface is used for the ultrasonic welding of the third plastic plate in place of a horn with flat end surface, the process described above can be repeated for the ultrasonic welding subsequent to the third layer. Thus, the plastic plates can be laminated successively.

The end surface of the ultrasonic horn used in the invention may composed of projections and indentations alone, but, it preferably contains flat portions in addition to projections and indentations, such as, disclosed in Japanese Patent KOKOKU 51828/1972. The projection and the indentation preferably adjoin each other. The projections and the indentations need not be formed on the whole surface of the end surface of the horn, and they may be formed only at the portion of the plastic plate to be bonded. The sectional shapes and the planar shapes of the projection and the indentation may be varied. For example, the sectional shape may be a circular arc, triangle or trapezoid. The projections and the indentation may be disposed in spot shape or linear shape. The projection may be surrounded with the indentations(s), or conversely, the indentation may be surrounded with the projection(s). When the projection is surrounded with the indentation(s), the combination of the projection and the indentation(s) may be a circular cone and a ring-shaped groove, a pyramid and a square groove, a trigonal pyramid and a triangular groove, or the like.

The protrusions, formed on the outer surface at the time when the plastic plate is bonded by ultrasonic welding using an ultrasonic horn having projections and indentations on the pressure face, may be capable of bonding the next plastic plate by ultrasonic welding.

An ultrasonic horn having projections alone on the pressure face may be used instead of the ultrasonic horn having projections and indentations on the pressure face. In this case, when the projections vibrated by ultrasonic waves penetrate into the midway of a plastic plate, melted plastic is forced out of the outer surface, and solidifies around the projection. The projected plastic mass acts energy concentrating body in the step to bond the next plastic plate by ultrasonic welding, and it bonds the plastic plates securely.

The ultrasonic horn used may be conventional except that the shape of the pressure face in accordance with the present invention is new. The ultrasonic horn may be in accordance with the disclosures of Japanese Patent KOKOKU 51828/1972, U.S. Pat. No. 3,819,437 and U.S. Pat. No. 3,867,232.

In the case where faces of the first and the second plastic plates opposite to each other are flat, the projections of the ultrasonic horn for bonding them are preferably taller than the thickness of the second plastic plate. However, even if the projections are slightly shorter than the thickness, and do not penetrate the second plastic plate, ultrasonic welding is still possible because the ultrasonic energy is concentrated around the projections.

In the case of laminating n layers of plastic plates, where n is an integer greater than 2, the ultrasonic horn(s) used for laminating the plastic plates up to (n-1)th preferably have projections and indentations on the end surface, and the ultrasonic horn used for laminating the last nth plastic plate preferably has a flat pressure face. In such a process, the outer surface is made flat and exhibits a better appearance.

In the laminating method of plastic plates of the invention, a second layer plastic plate is superimposed on a first layer plastic plate. Then, using a first ultrasonic horn having projections and indentations on the pressure face, both of the plastic plates are bonded to each other, whereby protrusions are formed on the outer surface of the second layer plastic plates.

A third layer plastic plate is superimposed on the second layer plastic plate in contact with the protrusions. When an ultrasonic horn having a flat end surface is pressed on the third layer plastic plate, the portions where the protrusions above and the third layer plastic plate come into contact are melted by ultrasonic heat energy and bonded to each other. Thus, a three-layered laminate of plastic plates having flat outer surfaces is formed.

If the third layer plastic plate superposed on the second layer plastic plate is bonded using an ultrasonic horn having projections and indentations on the end surface instead of a horn having flat end surface, a fourth plastic plate can be further bonded onto the third layer plastic plate by ultrasonic welding by virtue of the protrusions formed on its surface. By repeating similar processes, a plastic plates laminate having four or more layers can be made.

For a plastic plate laminate of n layers (four or more) layers having a flat outer surface, ultrasonic horn(s) having projections and indentations on the end surface are used for laminating up to (n-1)th plastic plate, and an ultrasonic horn having a flat end surface is used for laminating the last nth plastic plate.

According to the method of the invention, three or more plastic plates can be laminated without the need of a particular process to furnish the plastic plates with energy concentration bodies, such as, embossing, therefore the increase of manufacturing cost of materials due to such processes can be avoided. For example, the equipments and labor for embossing and the like can be omitted. In the conventional method, for laminating three or more plastic plates, it is necessary to provide two or more plastic plates with previously formed projections. Compared with such a conventional method, the manufacturing cost is sharply decreased with the method of the invention. Moreover, decreases in the accuracy of the thickness and the flatness of the sheet materials due to embossing are prevented.

EXAMPLES

Example 1

The example explained herein shows the present invention as applied to the process of laminating plastic plates during manufacturing chemical analytical slides. A schematic flow diagram is shown in FIG. 1 using sectional views.

Figure 1B:
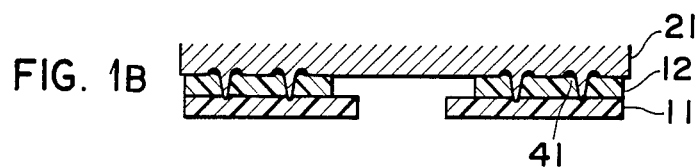

Two sheets of square plastic plates 11 and 12 are superimposed and bonded to each other by ultrasonic welding using an ultrasonic horn 21 and pressing them from the upside of plastic plate 12. The ultrasonic horn 21 has a plural number of projections 31 and indentations 33 surrounding each projection on the pressure face. When ultrasonic welding is carried out using this ultrasonic horn, protrusions 41 are formed on the upper face of the plastic plate 12 by the plastic melted out of the portion in contact with the projections 31 of the ultrasonic horn to the portion corresponding to the indentation 33. FIG. 1A shows a sectional view of the state of superimposing plastic plates 11 and 12 prior to pressing by the ultrasonic horn. FIG. 1B shows a sectional view of the state of bonding the plastic plates 11 and 12 by ultrasonic welding.

Figure 1C:
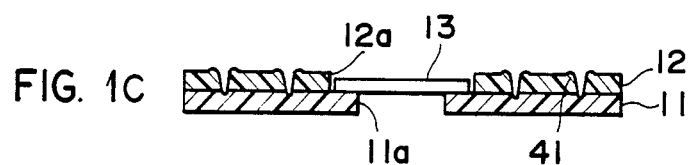

The plastic plates 11 and 12 are provided with a window 11a and 12a at the central portion, respectively. Since the window 12a is larger than the window 11a, a step portion is formed between the plastic plate 11 and the plastic plate 12. A chemical analytical film 13 is fitted into the step portion. FIG. 1C shows a sectional view of this state.

A third plastic plate 14 having a window 14a at the central portion is placed on the laminate (11+12) where two sheets of the plastic plates 11 and 12 is bonded, and ultrasonic bonding is carried out by pressing them by an ultrasonic horn 23 having a flat pressure face on the plastic plate 14. In such a process, since the protrusions 41 previously formed concentrate ultrasonic wave energy and act as energy concentrating bodies, the plastic plate 14 is securely bonded to the plastic 12 to complete the laminate 10. The surface of the laminate 10 is flat.

Figure 1D:
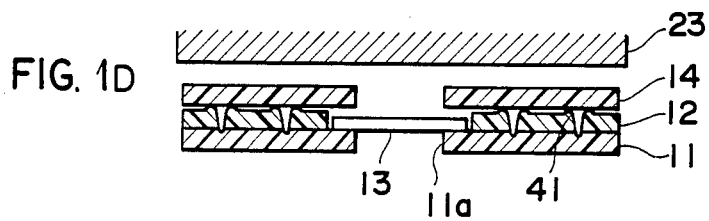
Figure 1E:
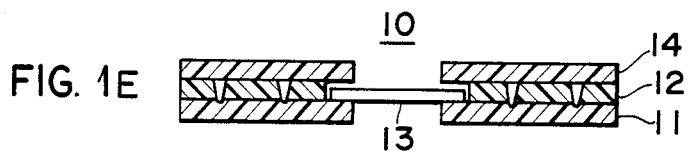

FIG. 1D shows a sectional view of the state before the plate 14 is bonded to the laminate (11+12) by ultrasonic welding, and FIG. 1E shows a sectional view of the bonded state by ultrasonic welding. FIG. 2 is an exploded perspective view of respective members in the state shown in FIG. 1D.

Example 2

A schematic flow diagram is shown in FIG. 3 using sectional views. The laminate 10 is prepared in a manner similar to Example 1 except that the ultrasonic horn 21 is replaced by an ultrasonic horn 22 having projections 32 alone on the pressure face and not having indentations surrounding the projection. In this example, the projections vibrated by ultrasonic waves are penetrated into a midway of the plastic plate 12, and the plastic plate 12 is bonded to the plastic plate 11 by ultrasonic welding. Protrusions 42 are formed on the upper face of the plastic plate 12 by the plastic melted out of the portions in contact with the projections 32 of the ultrasonic horn to the circumferences. They act as energy concentrating bodies at the time of the next ultrasonic welding, and are bonded to the plastic plate by ultrasonic welding.

FIG. 3A shows a sectional view of the state of merely superposing the plastic plate 12 on the plastic plate 11 before pressing them by the ultrasonic horn. FIG. 3B shows a sectional view of the state that the plastic plate 12 is bonded to the plastic plate 11 by ultrasonic welding. After the plastic plate 12 is bonded to the plastic plate 11 by ultrasonic welding, the procedures are the same as FIG. 1C, D and E, and therefore, the drawings are omitted.

Example 3

This example is an example of preparing a laminate where 6 sheets of plastic plates are stacked. A schematic flow diagram is shown in FIG. 4 using sectional views.

Figure 4A:
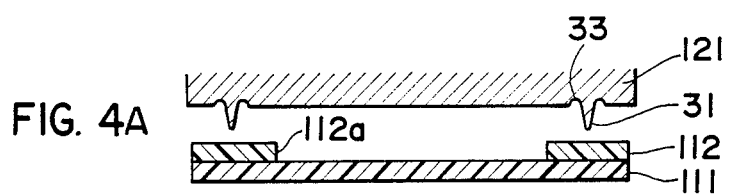
FIG. 4 is a sectional view illustrating the laminating process in Example 3.

A rectangular plastic plate 112 having a window at the central portion is superposed on a rectangular plastic plate 111 not having a window at the central portion, and they are bonded to each other by ultrasonic welding by pressing them by an ultrasonic horn 121 on the plastic plate 112. The ultrasonic horn 121 has projections 31 and indentations 33 surrounding it on the pressure face as used in Example 1. When ultrasonic welding is carried out using this ultrasonic horn, protrusions 141 are formed on the upper face of the plastic plate 112. FIG. 4A shows a sectional view of the state of merely superposing the plastic plate 112 on the plastic plate 111 before pressing them by the ultrasonic horn.

Figure 4B:
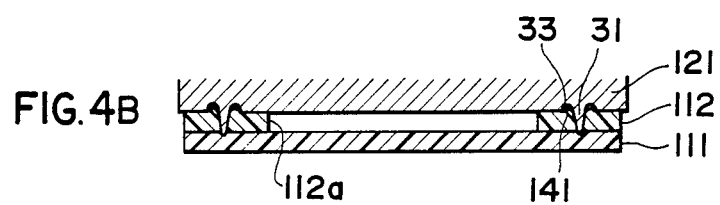

FIG. 4B shows a sectional view of the state that the plastic plate 112 is bonded to the plastic plate 11 by ultrasonic welding.

Figure 4C:
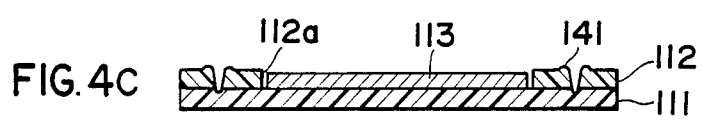

The plastic plate 112 is provided with a rectangular window 112a at the central portion, and a recess is formed in the laminate of the plate 111 and the plate 112 corresponding to the window 112a. A liquid-transferring member 113 is fitted in the recess. FIG. 4C shows a sectional view of this state.

Figure 4D:
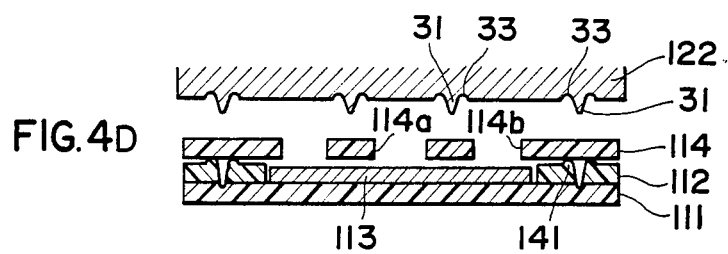
Figure 4E:
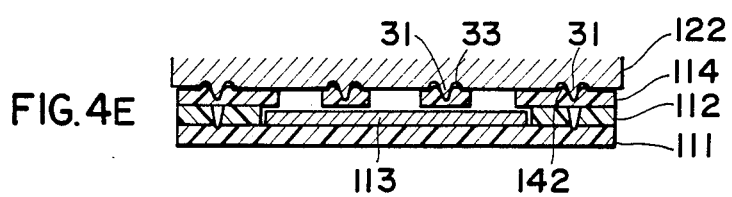

A third plastic plate 114 having a window 114a at the central portion and windows 114b disposed on both sides thereof is placed on the laminate (111+112) where two sheets of the plastic plates 111 and 112 are laminated and it is bonded by ultrasonic welding by pressing an ultrasonic horn 122 having a structure similar to the aforementioned ultrasonic horn 121 where the height of the projections 31 is less than the thickness of plastic plate 114 as can be seen in FIG. 4E. In such a process, since the protrusions 141 formed previously act as energy concentrating bodies to concentrate ultrasonic wave energy, the plastic plate 114 is securely bonded to the plastic plate 112, and protrusions 142 are formed on the upper face of the plastic plate 114. FIG. 4D shows a sectional view of the state before the plate 114 is bonded onto the laminate (111+112) by ultrasonic welding, and FIG. 4E shows a sectional view of the state that they are bonded by ultrasonic welding.

Figure 4F:
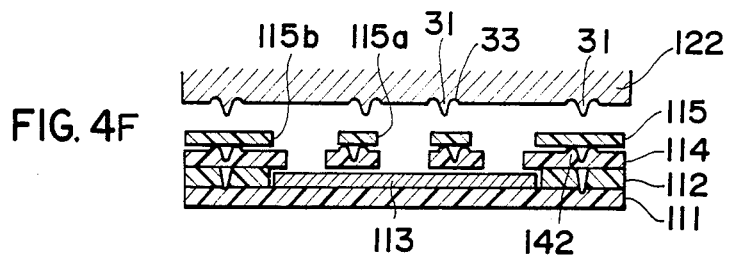
Figure 4G:
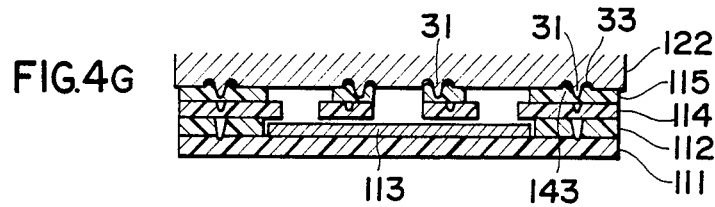

A plastic plate 115 having a window 115a at the central portion and windows 115b disposed on both sides thereof is placed on the laminate (111+112+114) where 3 sheets of the plastic plates 111, 112, 114 are laminated, and it is bonded by ultrasonic welding by pressing them by the ultrasonic horn 122 having short projections, from the upside of the plastic plate 115. Since the protrusions 142 act as energy concentrating bodies to concentrate ultrasonic wave energy, the plastic plate 115 is securely bonded to the plastic plate 114, and protrusions 143 are formed on the upper face of the plastic plate 115. FIG. 4F shows a sectional view of the state before the plate 115 is bonded onto the laminate (111+112+114) by ultrasonic welding, and FIG. 4G shows a sectional view of the state that they are bonded by ultrasonic welding.

Figure 4H:
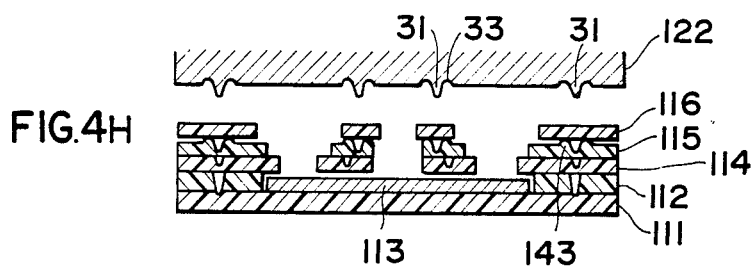
Figure 4I:
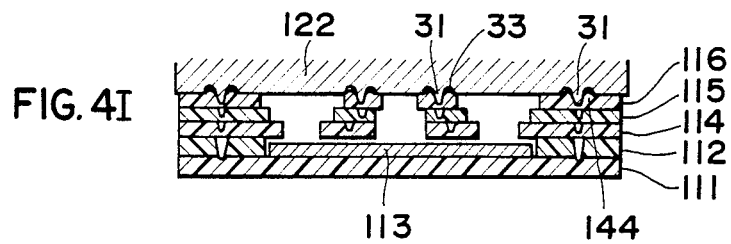
Figure 4J:
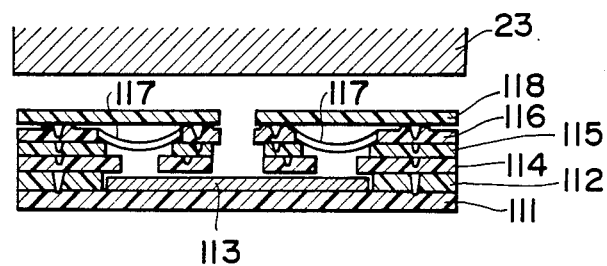

A plastic plate 116 having a window 116a at the central portion and windows 116b disposed on both sides thereof is placed on the laminate (111+112+114+115) where 4 sheets of the plastic plates 111, 112, 114, 115 are laminated, and it is bonded by ultrasonic welding by pressing them by the ultrasonic horn 122, from the upside of the plastic plate 116. The plastic plate 116 is securely bonded to the plastic plate 115, and protrusions 144 are formed on the upper face of the plastic plate 116. Besides, recesses are formed by the windows 116a and 116b. Ion-selective electrodes 117 are fitted in the recesses formed by the windows 116b so that the active face of the electrode is disposed downward. FIG. 4H shows a sectional view of the state before the plate 116 is bonded onto the laminate (111+112+114+115) by ultrasonic welding, and FIG. 4J shows a sectional view of the state that they are bonded by ultrasonic welding.

A plastic plate 118 having a window 118a at the central portion is placed on the laminate (111+112+114+115+116) where 5 sheets of the plastic plates 111, 112, 114, 115, 116 are laminated, and it is bonded by ultrasonic horn 23 having a flat pressure face from the upside of the plastic plate 118. The laminate 110 is thus prepared. The surface of the laminate 110 is flat, and it has an opening 118a. Since the opening 118a is connected to the liquid-transferring member 113a through the aforementioned windows 116a, 115a, 114a, a liquid supplied from the outside is received by the liquid-transferring member 113a. The liquid is then supplied to the ion-selective electrodes 117 through the aforementioned windows 115b, 114b, and electric potential corresponding to the ion concentration is generated in the electrodes. The ion concentration can be determined from this electric potential value.

Figure 4K:
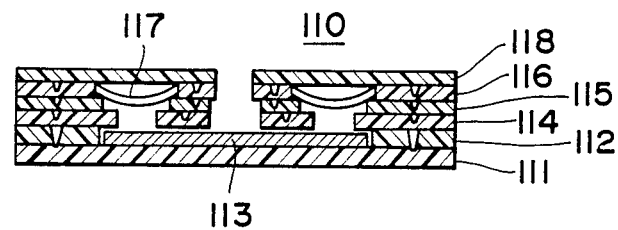

FIG. 4K shows a sectional view of the state before the plate 118 is bonded onto the laminate (111+112+114+115+116) by ultrasonic welding, and FIG. 4L shows a sectional view of the laminate 110 after the ultrasonic welding.

I claim:

1. A method for laminating thermoplastic resin members which comprises superimposing on a first thermoplastic resin plate a second thermoplastic resin plate, bonding the second thermoplastic resin plate to the first thermoplastic resin plate by ultrasonic welding with an ultrasonic horn having a pressure face with projections and indentations thereon from the upside of the second thermoplastic resin plate, to produce corresponding indentations and projections, respectively, on the upside surface of the second plate, superimposing a third thermoplastic resin plate onto the upside surface of the second thermoplastic plate and bonding the third thermoplastic resin plate to said second thermoplastic resin plate by ultrasonic welding with an ultrasonic horn having a flat pressure face from the upside of the third thermoplastic resin plate.

2. A method for laminating thermoplastic resin members which comprises superimposing on a first thermoplastic resin plate a second thermoplastic resin plate, bonding the second thermoplastic resin plate to the first thermoplastic resin plate by ultrasonic welding with an ultrasonic horn having a pressure face with projections and indentations thereon from the upside of the second thermoplastic resin plate, to produce corresponding indentations and projections, respectively, on the upside surface of the second plate, superimposing a third thermoplastic resin plate onto the upside surface of the second thermoplastic plate and bonding the third thermoplastic resin plate to said second thermoplastic resin plate by ultrasonic welding with an ultrasonic horn having projections and indentations on the pressure face from the upside of the third thermoplastic resin plate.

3. The method of claim 2 wherein a total of n thermoplastic plates are laminated together, wherein n is an integer greater than 2, and each plate except for the last, is welded to the previously laminated plate by ultrasonic welding with an ultrasonic horn having projections and indentations on its pressure face and wherein the last plate to be welded onto the laminate is welded with an ultrasonic welding horn having a flat pressure face.

4. The method of claim 2 which further comprises superimposing a fourth thermoplastic resin plate on said welded third thermoplastic resin plate, and bonding the fourth thermoplastic resin plate to the third thermoplastic resin plate by ultrasonic welding with an ultrasonic horn having a flat pressure face from the upside of the fourth thermoplastic resin plate.

5. A laminating method of thermoplastic resin members which comprises, superimposing a (n-1)th thermoplastic resin plate on a (n-2)th thermoplastic resin plate, bonding the (n-1)th thermoplastic resin plate to the (n-2)th thermoplastic resin plate by ultrasonic welding with an ultrasonic horn having projections and indentations on the pressure face from the upside of the (n-1)th thermoplastic resin plate wherein n is an integral number of more than 2, repeating the above process when n is more than 3, superimposing a nth thermoplastic resin plate on the welded (n-1)th thermoplastic resin plate, and bonding the nth thermoplastic resin plate to the (n-1)th thermoplastic resin plate by ultrasonic welding with an ultrasonic horn having a flat pressure face from the upside of the nth thermoplastic resin plate.

* * * * *